March 31, 1964  R. H. DU HAMEL ETAL  3,127,611
SIDE LOADED LOGARITHMICALLY PERIODIC ANTENNA
Filed Oct. 18, 1960  6 Sheets-Sheet 1
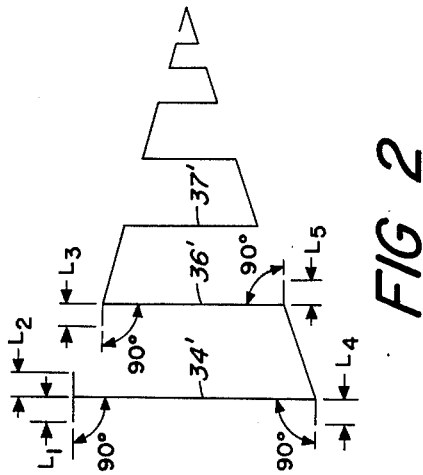
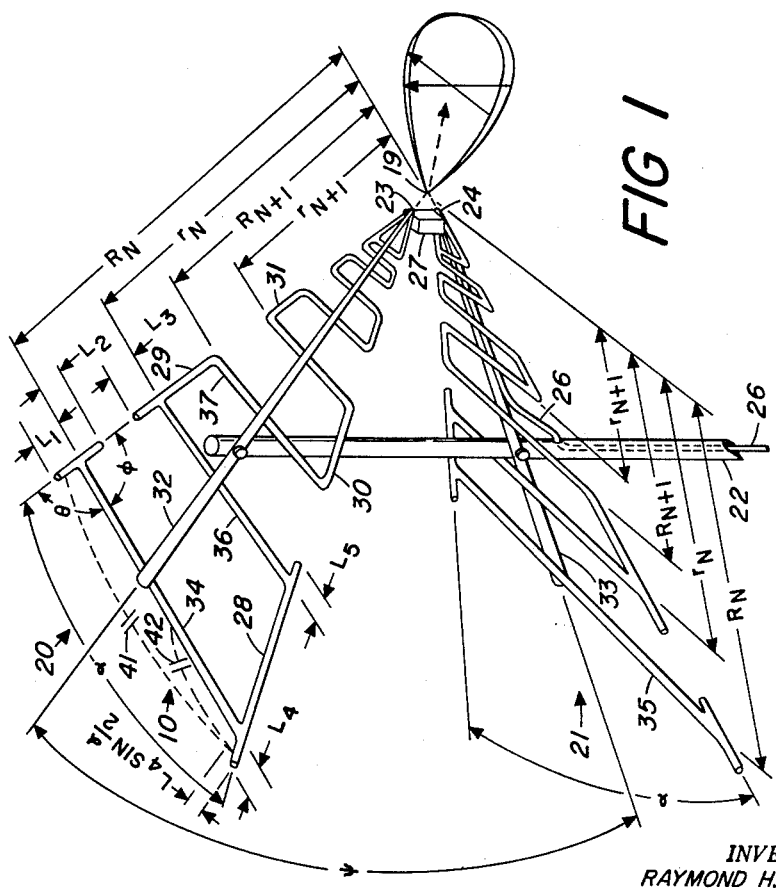
INVENTORS
RAYMOND H. DUHAMEL
VITO P. MINERVA
FRED R. ORE
BY
ATTORNEYS March 31, 1964  R. H. DU HAMEL ETAL  3,127,611
SIDE LOADED LOGARITHMICALLY PERIODIC ANTENNA
Filed Oct. 18, 1960  6 Sheets-Sheet 4
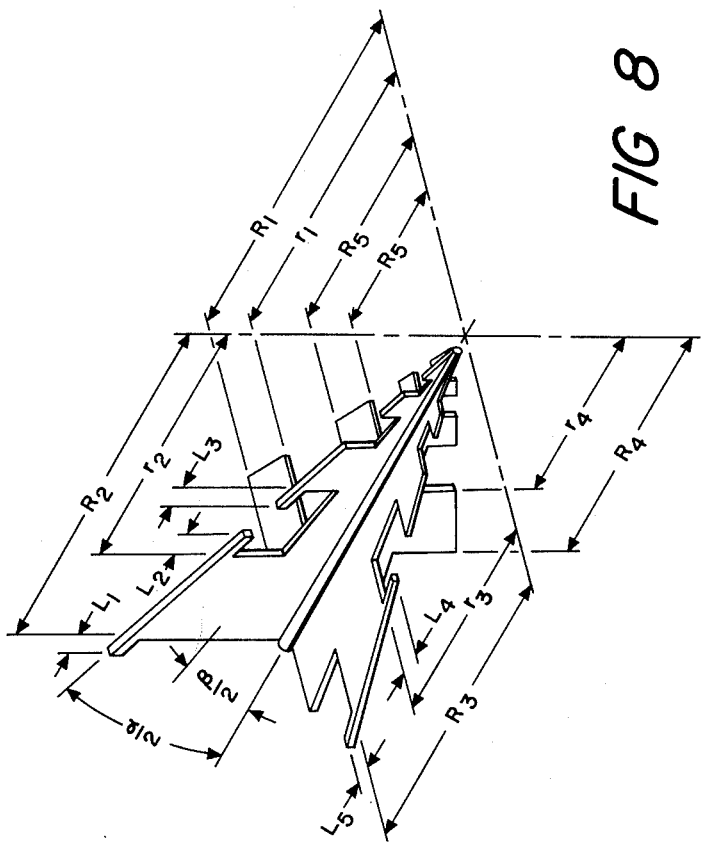
INVENTORS
RAYMOND H. DUHAMEL
VITO P. MINERVA
FRED R. ORE
BY Moody and Phillson
ATTORNEYS

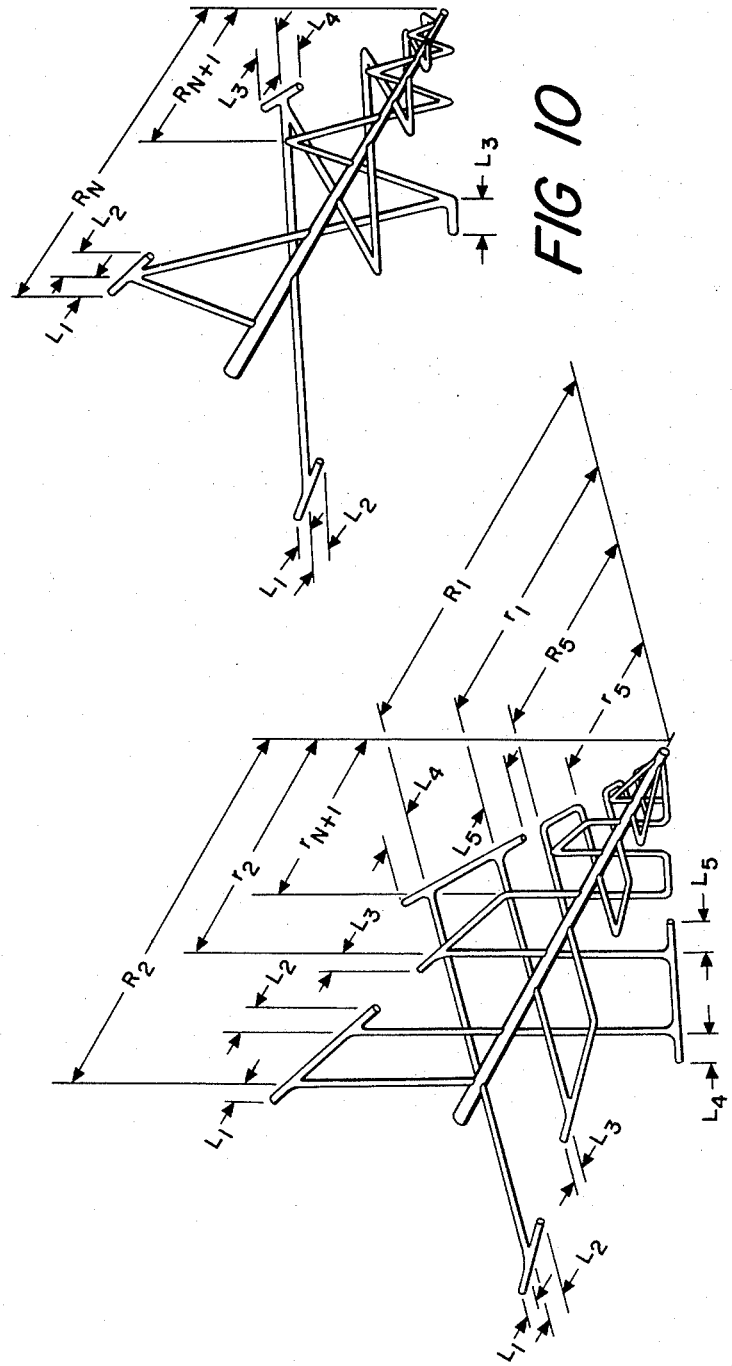

March 31, 1964     R. H. DU HAMEL ETAL     3,127,611
SIDE LOADED LOGARITHMICALLY PERIODIC ANTENNA
Filed Oct. 18, 1960     6 Sheets-Sheet 6

INVENTORS
RAYMOND H. DUHAMEL
VITO P. MINERVA
FRED R. ORE
BY *Moody and Phillson*
ATTORNEYS

United States Patent Office 3,127,611
Patented Mar. 31, 1964

3,127,611
SIDE LOADED LOGARITHMICALLY PERIODIC ANTENNA
Raymond H. Du Hamel, Vito P. Minerva, and Fred R. Ore, Cedar Rapids, Iowa, assignors to Collins Radio Company, Cedar Rapids, Iowa, a corporation of Iowa
Filed Oct. 18, 1960, Ser. No. 63,299
8 Claims. (Cl. 343—792.5)

This invention relates generally to logarithmically periodic antennas and, more specifically, to a logarithmically periodic type antenna in which the lower frequency limit is extended without a corresponding increase in the size of the antenna.

Logarithmically periodic antennas, hereinafter sometimes referred to as log periodic antennas, are a recent development in the antenna art. Such antenna systems may be described generally as consisting of individual antenna elements, each antenna element being generally triangular in shape, having a vertex and having side elements defined by an angle $\alpha$ extending from the vertex. More specifically, each antenna element is comprised of at least two radial sections having a common side defined by the center line of the antenna element and having the other side defined by a radial line extending from the vertex at an angle $\alpha/2$ with respect to said center line. Each radial member has a plurality of teeth which are all similar to one another in shape, but which become progressively larger and spaced progressively farther apart as the distance from the vertex increases. The above relationship may be expressed by stating that the radial distance from the vertex to any given point on a tooth in a given radial section bears a constant ratio $\tau$ to the radial distance of a corresponding point on the next adjacent tooth which is farther removed from the vertex than said given tooth. In the most general case, where each antenna employs two radial elements lying in the same plane, the teeth of one of the radial members are positioned opposite the gaps between the teeth of the other radial member.

The log periodic antenna elements described in the preceding paragraph may be arranged in many different combinations to perform desired functions. Usually the antenna elements are employed in multiples of two. For example, a pair of such antenna elements may be positioned with respect to each other so that the vertices are positioned near each other although not quite touching (for purposes of electrical separation) and which extend out from the common vertex in such a manner as to assume positions corresponding to opposite sides of a pyramidal-shaped structure. Such an arrangement is known in the art as a non-planar array of two log periodic antenna elements. An alternative is to arrange two or more log periodic antenna elements in a fan-like manner with their vertices near each other, but not quite touching, and which lie in the same plane. Such an arrangement is known in the art as a co-planar array of log periodic antennas. Various combinations of co-planar and non-planar arrays can be built up to produce different radiation patterns, such as steerable beams, circularly polarized beams, and other desirable radiation patterns. Although such structures will be described in some detail later herein, the reader's attention is directed to the following patent applications which are hereby incorporated by reference into the present specification:

United States patent application, Serial No. 721,408, filed March 14, 1958 by Raymond H. DuHamel and Fred R. Ore entitled "Logarithmically Periodic Antenna," now Patent No. 3,079,602;

United States patent application, Serial No. 804,357, filed April 6, 1959 by Raymond H. DuHamel and David G. Berry entitled "Uni-Directional Frequency Independent Co-Planar Antenna," now Patent No. 2,989,749;

United States patent application, Serial No. 841,391, filed September 21, 1959 by Raymond H. DuHamel et al., entitled "Antenna Arrays," now Patent No. 3,059,234;

United States patent application, Serial No. 841,400, filed September 21, 1959 by Raymond H. DuHamel et al., entitled "Broadside Antenna Arrays," now Patent No. 2,984,835;

United States patent application, Serial No. 31,068, filed May 23, 1960 by David G. Berry, entitled "Uni-Directional Circularly Polarized Antenna."

The lower frequency limitation of the prior art log periodic antenna elements is determined almost entirely by the length of the longest transverse dipole element which ordinarily has a length equal to the half-wave length of the lowest frequency of the usable bandwidth of the log periodic antenna element. For example, if the longest transverse dipole element of a log periodic antenna element is 7 feet long, then the lower frequency limit of the antenna element would be about 72 megacycles. In order to extend the lower frequency limit to, say 60 megacycles, it would ordinarily be necessary to increase the size of the antenna element so that the longest transverse dipole would be about 8.4 feet long. Such an increase in the size of the antenna element, however, carries with it a considerable increase in the cost of the antenna. Such increase in cost is greater than the proportionate increase in size, since roughly speaking, the total weight of the antenna increases approximately as the cube power of an increase in lineal distance. A further consideration is the fact that more space is required for a log periodic antenna in which the longest transverse dipole is 8.4 feet, than is required for a log periodic antenna element in which the longest transverse element is only 7 feet.

It is an object of the present invention to extend the lower frequency range of a log periodic antenna element without increasing the length of the longest transverse dipole of the antenna element.

A further object of the invention is to increase the usable frequency bandwidth of a given log periodic antenna element without appreciably increasing the size of the antenna.

Another aim of the invention is to decrease the cost of a log periodic antenna designed to operate over a given frequency bandwidth.

A further purpose of the invention is the improvement of the log periodic antenna elements, generally.

In accordance with the invention the two or three longest transverse dipoles of each antenna element are end loaded by short conductive elements which are fastened to both ends of the two or three longest transverse dipole elements and which lie in the same plane as the antenna element. The angle between the end loading elements and the transverse dipole element to which they are connected is not critical and may vary from 90° down to 20 or 25°. It will be apparent, however, that any angle other than 90° will tend to add to the over-all physical length of the transverse dipoles to which the end elements are attached, (herein sometimes referred to the associated transverse dipole element).

In another embodiment of the invention the end loading elements have a portion thereof folded back towards the center line of the antenna element substantially parallel to the transverse element to which they are attached.

In accordance with a feature of the invention, the addition of the end loading elements functions to introduce a shunt capacitance across the associated transverse dipole elements, thus increasing the total capacitance of the transverse dipole and, of course, decreasing the resultant capacitive reactance of the transverse dipole. Since an antenna element presents a capacitive reactance to a signal whose frequency is less than the resonant frequency of the dipole, it follows that by decreasing the capacitive reactance of the dipole the zero reactance characteristics (resonant condition) will occur at a lower frequency, which is the principal desired objective of the invention.

The aforementioned objects and features of the invention will be more fully understood from the following detailed description thereof when read in conjunction with the drawings in which FIG. 1 represents a perspective view of a two-element non-planar array of log periodic antennas employing end loaded antenna elements;

FIG. 2 shows an alternative form of end loading the individual antenna elements of FIG. 1;

FIG. 8 shows an end loaded antenna array designed to produce a circularly rotating radiation beam;

FIG. 9 shows a perspective view of an end loaded antenna array employing wire formed trapezoidally shaped teeth and constructed to produce a rotating beam pattern;

FIG. 10 shows a perspective view of an end loaded antenna array employing rod formed triangularly shaped teeth and constructed to produce a rotating beam pattern;

Figure 3:
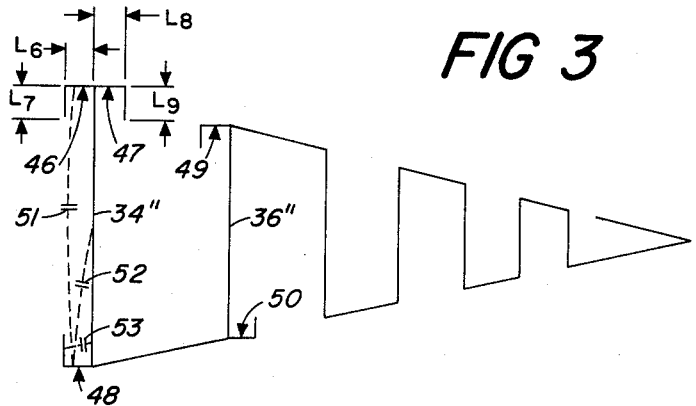
FIG. 3 shows another alternative form of end loading.
Figure 4:
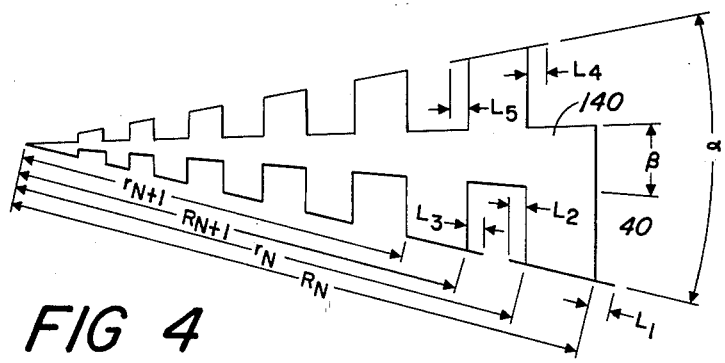
FIG. 4 shows a plan view of an end loaded antenna element having solid rectangularly shaped teeth.
Figure 5:
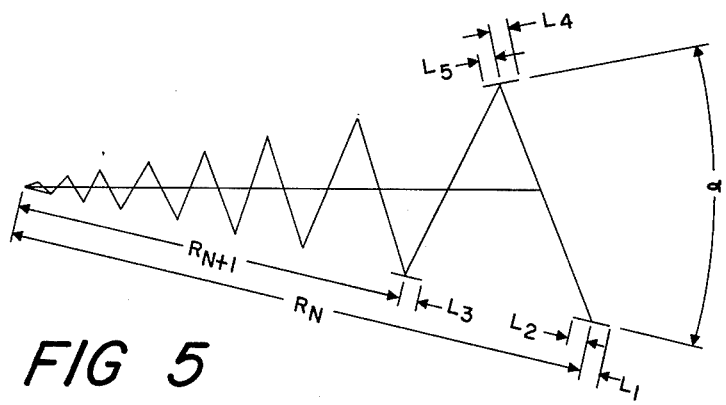
FIG. 5 shows a plan view of an end loaded antenna element of the type having triangularly shaped teeth.
Figure 6:
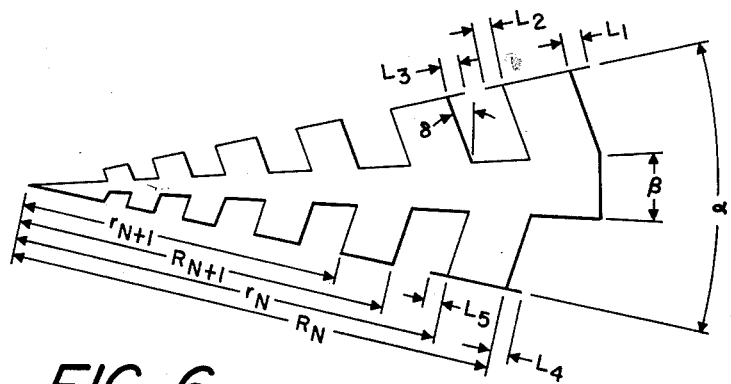
FIG. 6 illustrates another form of an end loaded antenna element employing solid trapezoidally shaped teeth.
Figure 7:
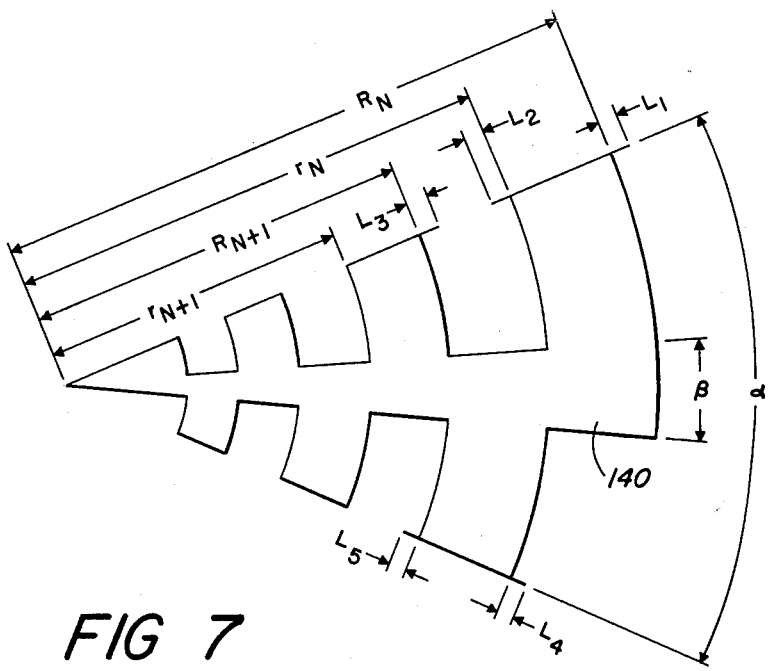
FIG. 7 shows another type end loaded antenna element employing solid curvilinearly shaped teeth.
Figure 11:
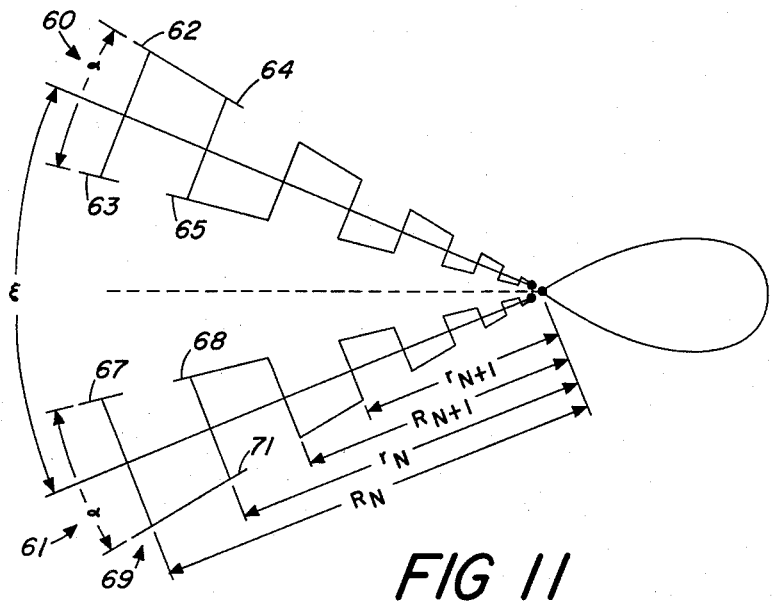
FIG. 11 illustrates two-element co-planar arrays of end loaded antenna elements.

Referring now to FIG. 1, the two antenna elements 20 and 21 are mounted on a vertical beam 22 which carries a lead-in coaxial cable 26. The vertices 23 and 24 of the two antenna elements are positioned near to each other, but do not make physical connection. For purposes of discussion herein, assume point 19 is the common vertex. Electrical isolation between the two log periodic antenna elements 20 and 21 is required since the signal to be radiated is applied across said two antenna elements by some convenient means such as inner and outer conductors of the coaxial cable 26. The block 27, which is of an insulative material, is merely a means for separating the vertices 23 and 24 and for maintaining such separation.

The particular log periodic antenna element shown in FIG. 1 employs trapezoidal teeth formed by bending a wire or rod 28 into the desired tooth shape and welding, or otherwise securing, the end pieces thereon. As indicated hereinbefore, the spacing between the teeth of the log periodic antenna is a logarithmical function. More specifically, the radial distance from the vertex to a given point on any tooth of a given radial section to the radial distance from the vertex to a corresponding point on the adjacent tooth next farthest from the vertex of the element is equal to a constant $\tau$.

Thus in FIG. 1

$$\frac{R_{N+1}}{R_N} = \tau \frac{r_{N+1}}{r_N}$$

The side connecting portions of the teeth, such as portions 29, 30, and 31 lie along radial lines which extend from the vertex 19 of the antenna element and form an angle $\alpha$. The angular separation between the center conductors 32 and 33 of the log periodic antenna elements 20 and 21 is designated by the angle $\psi$.

The antenna elements 20 and 21 are what is known as non-mirrored images of each other. More specifically, the antenna elements 20 and 21 are exactly alike, except that one has been rotated 180°. The purpose of non-image arrangement is to produce a single-lobe radiation pattern. Since the signals applied to the antenna elements 20 and 21 will have a 180° time phase relationship, the rotating of one of the elements 20 or 21 180° with respect to the other element will result in a similarly poled current distribution of any two corresponding transverse dipoles of the antenna elements 20 and 21. For example, the current distribution of the corresponding transverse dipole elements 34 and 35 will be in the same direction (i.e., have the same polarity in space) so that the electric fields generated in conjunction with these two current flows would add in the plane which bisects the angle formed by the antenna elements 20 and 21 and which is parallel to the transverse dipole elements of the antenna elements 20 and 21. If the antenna elements 20 and 21 were mirrored images of each other they would then produce a two-lobe radiation beam pattern in the E plane, instead of a single-lobe pattern.

As used above, a transverse dipole element is defined as an element such as elements 34, 35, or 36 which spans the entire distance across an antenna element. From time to time in this specification and claims it will be desirable to define that portion of a transverse dipole element which extends from the centrally located boom to an outer edge of the antenna element, i.e, that portion of the transverse dipole element spanning the distance across a radial section. Such portion of a transverse dipole element is hereby defined as a half length transverse element.

Assume that the length of the longest transverse dipole elements 34 and 35 of antenna elements 20 and 21 is 7 feet. In the absence of end loading, as described in this invention, such a 7-foot dipole length will establish the lower frequency limit of the antenna array at about 72 megacycles. By means of the end loading elements described in this invention, the lower frequency limit is extended about 15% to 20% down to about 60 megacycles without increasing the over-all length of the transverse dipole elements. Such end loading structure, in FIG. 1, is represented by the elements $L_1$ through $L_5$ (which reference characters also designate the length of the various end loading elements). Each of these elements are conductive members which are secured to the ends of the transverse dipole members by suitable means, such as welding or bolting, or other connecting means by which good electrical connection and good support are obtained.

The length of the elements $L_1$, $L_2$, and $L_4$, preferably are the same and are equal to about 6.5% of the length of the transverse dipole element 34. It is to be understood that the 6.5% figure is not a a critical figure, but merely represents a figure with which near optimum results have been obtained. It would be possible, for example, to have the length $L_2$ somewhat shorter, or even longer, than length $L_1$ and still maintain good operating characteristics. It is possible that minute advantages might be gained by apportioning the lengths $L_2$ and $L_1$ in accordance with the value of $\tau$, whereby the ratio $L_2/L_1 = \tau$ is maintained.

The specific angles $\theta$ and $\phi$ that $L_1$ and $L_2$ make with the dipole element 34 also are not very critical. In the form shown in FIG. 1 the elements $L_1$ through $L_5$ lie along radial lines extending from the vertex 23 so that the angle $\theta$ is larger than the angle $\phi$ by an amount equal to $\alpha$. In FIG. 2 the elements $L_1$ through $L_5$ are shown as forming 90° angles with dipole to which they are affixed. It will be apparent that if a right angle relationship exists between the end loading elements and the associated dipole elements, then the over-all length of the dipole elements will not be increased, whereas if the end loading elements lie along radial lines, as shown in FIG. 1, the end loading elements will add to the length of the dipole element 34 by an amount equal to $2L_4 \sin \alpha/2$, ($L_1$ equals $L_4$). Thus, to a degree, one of the principal purposes of the end loading elements is partially defeated unless there is a 90° relationship between said end loading elements and the associated transverse dipole element. On the other hand, however, the use of a 90° relationship between the end loading elements and the dipole element to which they are affixed results in elements such as $L_2$ and $L_5$ (or FIG. 2) extending out beyond the radial line which otherwise would define the edges of the log periodic antenna element. The choice of which configuration to employ in any given application is largely one determined by the space available for the antenna installation, the relative difficulty of fastening the end loading elements, and other practical considerations.

It is to be noted that positioning the end loading elements along a radial line defining the antenna element, or positioning them at right angles to the associated transverse dipoles, is not the only manner in which the end loading elements can be connected. They can be connected, for example, in any position lying in-between the aforementioned two positions, or they can be connected in positions lying outside the two positions described above. For example, $\phi$ could be made larger than $\theta$. Although at the present time no particular advantage is seen in making $\phi$ larger than $\theta$, it is to be understood that such an arrangement would function quite satisfactorily electrically. The principal disadvantage of such an arrangement would be largely a loss of compactness of the antenna array.

A further point to be noted is that end loading elements have been added only to the transverse dipole elements 34 and 36 of antenna element 20 and to the corresponding transverse dipole elements of antenna element 21. If desired, such end loading could be added in a similar manner to transverse dipole element 37 and so on down into successively shorter ones of the transverse dipole elements. However, such end loading into the shorter transverse dipole elements would serve no particular useful function inasmuch as the primary objectives of end loading is to increase the lower frequency limit of the antenna array without lowering the upper frequency limit. Consequently, end loading of the longest two or three of the dipole elements, only, seems to be adequate.

In one form of the invention the length of the element $L_3$ bears a relationship $\tau^{1/2}$ to the length of the elements $L_1$ or $L_4$ since the transverse dipole element 36 is 180° phase removed from the transverse dipole element 34. Worded in another way, it will be recalled that the radial distance to a point on any given tooth bears a ratio $\tau$ to the corresponding radial distance to a corresponding point on the next adjacent tooth farther out from the vertex. Thus, the length of the transverse dipole element 37 will bear a ratio $\tau$ to the length of the transverse dipole element 34; the elements 37 and 34 representing corresponding sides of adjacent teeth. The transverse dipole element 36, in the illustrated embodiment of the invention, lies at the logarithmic mid-point between dipole elements 37 and 34 and, consequently, will bear a ratio $\tau^{1/2}$ to the length of the transverse dipole element 34. In keeping with this logarithmic relationship the length of the end loading element $L_3$ will bear the relationship $\tau^{1/2}$ to the end loading element $L_1$. In accordance with another form of the invention, however, $$\frac{L_3}{L_1} < \tau^{1/2}$$

so as to provide a smoother transition impedance-wise between the end loaded transverse dipole elements and the transverse dipole elements which are not end loaded.

The present theory of operation of the end loading is as follows. It is well-known that when an antenna is operated at a frequency below the resonant frequency, the antenna structure exhibits a series capacitive reactance. It will be apparent that if either an inductor can be added in series with the said series capacitance, or alternatively, capacitance can be added in parallel with the said series capacitive reactance, that the over-all series capacitive reactance of the antenna will be reduced. This perhaps can be seen more clearly when it is realized that capacitances in parallel add algebraically and result in a lower over-all capacitive reactance since capacitive reactance is inversely proportional to capacitance. Consequently, by adding parallel capacitance to an antenna structure resonance will occur, (that is, capacitive and inductive capacitance will be equal) at a lower frequency than if the shunt capacitance were not present. In the present invention the end loading functions to add such shunt capacitance to the antenna structure. Such capacitance is shown schematically by the capacitors 41 and 42 of FIG. 1, which capacitors can be seen to be effectively in shunt with the entire length, or a portion of the length, of the transverse dipole element 34. It is to be noted that in reality the capacitors 41 and 42 are distributed capacitances and not lumped capacitances, as shown.

Referring now to FIG. 3, there is shown another form of end loading elements. In this modification a portion of the end loading elements are folded back so as to have said portion substantially parallel with the dipole to which they are attached. More specifically, in the structure of FIG. 3 the end loading element 46 is comprised of a portion $L_6$ which is normal to the transverse dipole element 34″ and a second portion $L_7$ which is substantially parallel with the dipole element 34″. End loading element 47 also comprises two portions, one having a length $L_8$ and the other having a length $L_9$. The length $L_8$ is normal to the transverse dipole element 34″, while the element $L_9$ is folded back to be substantially parallel to the dipole element 34″. Similarly, end loading elements 48, 49, and 50 are comprised of a portion normal to the dipole element to which they are affixed and a portion parallel to said dipole element. The shunt capacitances introduced across a portion or the entire length of the dipole antenna element, such as element 34, are represented by dashed line capacitors 51, 52, and 53. A greater shunt capacitance per unit length of the folded back portion of the end loading elements is created with an adjacent portion $L_7$ of the transverse dipole element to which it is attached than is created per unit length between the normal portion of the end loading elements and the transverse dipole element. However, the last mentioned capacitance spans a greater portion of the transverse dipole element than does the first-mentioned shunt capacitance and, consequently, is more effective, per unit capacitance, in decreasing the over-all capacitive reactance of the dipole element. It can be seen that by making the normal portion of the end loading elements longer, the shunt capacitance between the normal portion of the end loading elements and the transverse dipole element will become greater but the shunt capacitance between the folded back portion of the end loading element and the transverse dipole element will become less because of the increased spacing therebetween. However, the capacitance that does exist between the folded back portion of the end loading element and the transverse dipole will extend farther toward the far end of the transverse dipole and thus be in parallel with an increased portion of the transverse dipole structure, thereby tending to compensate for the increased spacing from the dipole element.

From the foregoing, it will be apparent that there are no extremely critical values of the lengths of the normal and the folded back portion of the end loading elements with respect to the length of the transverse dipole element to which they are affixed. It has been found, however, that good performance can be obtained when the normal portion of the end loading element is about 6.5% of the length of the transverse dipole element and the folded back portion of the end loading element is about 10% of the length of the associated transverse dipole element. Thus, the lengths $L_7$ and $L_9$ in a near optimum design would be about 10% of the length of the dipole element 34″.

Although up to the present point the end loading elements have been discussed in connection with a log periodic antenna element having teeth formed in the shape of a trapezoid by banding a conductive rod, the end loading elements of the invention can be employed with any of several other types of log periodic antenna elements, such as shown in FIGS. 4, 5, 6, 7, 8, 9, and 10. In all of the structures shown in FIGS. 2 through 10 the end loading elements are designated by reference characters $L_1$, $L_2$, $L_3$ ... $L_r$ in the manner shown in the structure of FIG. 1. The ratios of the length of the end loading elements to the length of the transverse dipole elements to which they are affixed of each of the structures shown in FIGS. 4 through 10 are about the same for near optimum performance as in the case of the structures of FIGS. 1 and 3. In the case of FIGS. 4, 6, 7, and 8, which are solid teeth log periodic antenna type structures, the length of the transverse dipole is defined herein as having a length extending completely across the angle α although in the drawing the tooth may appear to terminate short of such distance (as in the case of edge 140 in the structure of FIG. 4).

In FIGS. 4 through 10 it is to be noted that the radial distances $R_N$, $r_N$, $R_{N+1}$, $r_{N+1}$ bear the same ratio τ to each other as defined in the case of the structure of FIG. 1.

In FIGS. 8, 9, and 10 the structures shown are designed to produce circularly polarized beam polarities. The theory of these structures is discussed in detail in United States patent application, Serial No. 841,391, identified hereinbefore.

Figure 12:
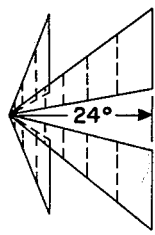
FIGS. 12, 13, and 14 illustrate typical antenna arrays in which the end loaded elements can be employed.
Figure 13:
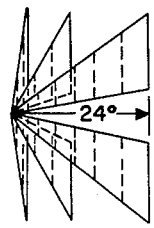
Figure 14:
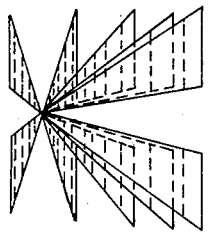

Referring now to FIGS. 11, 12, 13, and 14 there are shown various types of arrays in addition to the one shown in FIG. 1 in which the antenna elements of FIGS. 2 through 5 may be arranged. More specifically, in FIG. 11, for example, there is shown a mirrored image co-planar array of two log periodic antenna elements 60 and 61, as discussed in detail in United States patent application, Serial No. 804,357. The array shown in FIG. 11 will produce a single-lobe radiation pattern in the E plane. The addition of the end loading elements 62, 63, 64, 65, 67, 68, 69, and 71 will extend the lower frequency limt of the array as discussed hereinbefore. FIGS. 12, 13, and 14 show possible combinations of non-planar and co-planar arrangements of the antenna elements shown in FIGS. 2 through 7.

Although the end loading structures are not shown in FIGS. 12, 13, and 14 it is to be understood that they are a part of the particular antenna element employed in the array. The individual antenna elements in FIGS. 12, 13, and 14 are mere schematic representations. As of the present time, no limitation has been found in the use of the end loaded log periodic antenna elements in any of the arrays shown and discussed specifically herein or in any of the copending applications incorporated by reference herein.

It is to be noted that the forms of the invention shown herein are but preferred embodiments thereof and that various changes in relative sizes and shape configuration may be made without departing from the spirit or scope of the invention.

We claim:

1. In an antenna array, a plurality of log periodic antenna elements, each comprising a plurality of radial sections having a common side, each of said radial sections being generally triangular in shape, having a substantially common vertex, and comprising a plurality of teeth extending outwardly from said common side, the radial distance of any given tooth from said common vertex bearing a constant ratio τ to the radial distance of the adjacent tooth next farthest removed from said common vertex, said teeth comprising a plurality of half length transverse conductive elements, end loading elements secured to the outer ends of the longest of said half length transverse conductive elements, said end loading elements comprising conductive members which are short compared with the lengths of said longest half length transverse conductive members and which make good electrical connection with the ends of said longest half length transverse conductive elements, each of said end loading elements constructed and arranged to produce capacitance in parallel with at least a portion of the characteristic impedance of the half length transverse conductive element to which it is connected.

2. An antenna array in accordance with claim 1 in which each of said antenna elements comprises first, second, thrid, and fourth radial sections arranged at 90° space intervals around said common side in the order enumerated, each radial section of each pair of oppositely positioned radial sections having its teeth positioned substantially opposite the gaps between the teeth of the oppositely positioned radial section, the radial distance from said common vertex to any given point on any tooth of said first and third radial sections bearing a constant ratio K to the radial distance to any corresponding point on the second and fourth radial sections, respectively.

3. An antenna array in accordance with claim 1 comprising second end loading elements secured to the ends of the second longest half length transverse conductive element of each radial section, said second end loading elements having a shape similar to the shape of said first end loading elements and being positioned with respect to said second longest half length transverse conductive element similarly to the manner in which said first end loading elements are positioned with respect to said longest half length transverse conductive element.

4. An antenna array in accordance with claim 3 in which each of said antenna elements comprises first, second, third, and fourth radial sections arranged at 90° space intervals around said common side in the order enumerated, each radial section of each pair of oppositely positioned radial sections having its teeth positioned substantially opposite the gaps between the teeth of the oppositely positioned radial section, the radial distance from said common vertex to any given point on any tooth of said first and third radial sections bearing a constant ratio K to the radial distance to any corresponding point on the second and fourth radial sections, respectively.

5. An antenna element in accordance with claim 1 in which said end loading elements consist of substantially straight conductive members which form an angle θ with the half length transverse conductive element to which said end loading elements are attached, said angle θ being greater than 0° and less than 180°.

6. An antenna array in accordance with claim 5 in which each of said antenna elements comprises first, second, third, and fourth radial sections arranged at 90° space intervals around said common side in the order enumerated, each radial section of each pair of oppositely positioned radial sections having its teeth positioned substantially opposite the gaps between the teeth of the oppositely positioned radial section, the radial distance from said common vertex to any given point on any tooth of said first and third radial sections bearing a constant ratio K to the radial distance to any corresponding point on the second and fourth radial sections, respectively.

7. An antenna element in accordance with claim 1 in which each of said end loading elements consist of a first portion which extends outwardly in a direction generally transverse to the attached half length transverse conductive member, and a second portion which is folded back to extend in towards the said common side of the radial section in a manner generally parallel to the attached half length transverse conductive element, said first and second portions of said end loading elements lying substantially in the same plane as the radial section of which the end loading elements are a part.

8. An antenna array in accordance with claim 7 in which each of said antenna elements comprises first, second, third, and fourth radial sections arranged at 90° space intervals around said common side in the order enumerated, each radial section of each pair of oppositely positioned radial sections having its teeth positioned substantially opposite the gaps between the teeth of the oppositely positioned radial section, the radial distance from said common vertex to any given point on any tooth of said first and third radial sections bearing a constant ratio K to the radial distance to any corresponding point on the second and fourth radial sections, respectively.

References Cited in the file of this patent

UNITED STATES PATENTS

| | | |
|---|---|---|
| 2,083,260 | Godley | June 8, 1937 |
| 2,642,528 | Albright | June 16, 1953 |
| 2,984,835 | Du Hamel et al. | May 16, 1961 |
| 2,985,879 | Du Hamel | May 23, 1961 |
| 3,079,602 | Du Hamel et al. | Feb. 26, 1963 |

OTHER REFERENCES

Du Hamel and Ore: "Logarithmically Periodic Antenna Designs," March 24–27, 1958, IRE National Convention Record, Part I, pages 139–151.